United States Patent [19]

Nakajima et al.

[11] Patent Number: 4,598,370

[45] Date of Patent: Jul. 1, 1986

[54] APPARATUS FOR CONTROL OF ACCELERATION AND DECELERATION DURING AUTO-CRUISE

[75] Inventors: Tetsuo Nakajima; Tomio Aoi, both of Saitama, Japan

[73] Assignee: Honda Giken Kogyo Kabushiki Kaisha, Tokyo, Japan

[21] Appl. No.: 571,891

[22] Filed: Jan. 18, 1984

[30] Foreign Application Priority Data

Jan. 27, 1983 [JP] Japan ................................. 58-10521
Jan. 27, 1983 [JP] Japan ................................. 58-10522

[51] Int. Cl.$^4$ ............................................. B60K 31/00
[52] U.S. Cl. ............................... 364/426; 364/431.07; 180/170; 123/352
[58] Field of Search ................... 364/424, 426, 431.01, 364/431.07; 180/170, 174, 176–179; 123/351, 352, 370, 371, 376

[56] References Cited

U.S. PATENT DOCUMENTS

| 3,804,193 | 4/1974 | Ikuta | 123/352 |
| 3,820,624 | 6/1974 | Sakakibara | 123/352 |
| 3,893,537 | 7/1975 | Sakakibara | 123/352 |
| 4,215,760 | 8/1980 | Sakakibara | 123/352 |
| 4,325,336 | 4/1982 | Kuno et al. | 364/431.07 |
| 4,535,864 | 8/1985 | Tanigawa et al. | 180/179 |

Primary Examiner—Gary Chin
Attorney, Agent, or Firm—Pollock, Vande Sande and Priddy

[57] ABSTRACT

This invention provides an apparatus for the control of acceleration and deceleration of an automobile, which enlarges the ratio of increase in the real speed of the automobile while the automobile is accelerated from its auto-cruise condition and precludes overshoot and hunting of the real speed of the automobile after the acceleration or deceleration is completed and the resumption of constant-speed travel is started. In the course of acceleration, the throttle opening angle is first increased abruptly by a predetermined amount and then increased as the function of time and, upon disappearance of an acceleration signal, the throttle opening angle is decreased by an amount based on the real speed of the automobile as it exists at that moment. In the course of deceleration, the throttle opening angle is decreased abruptly to a very small value which may be almost zero and, upon disappearance of a deceleration signal, the throttle opening angle is increased to a level based on the real speed of the automobile as it exists at that moment.

9 Claims, 21 Drawing Figures

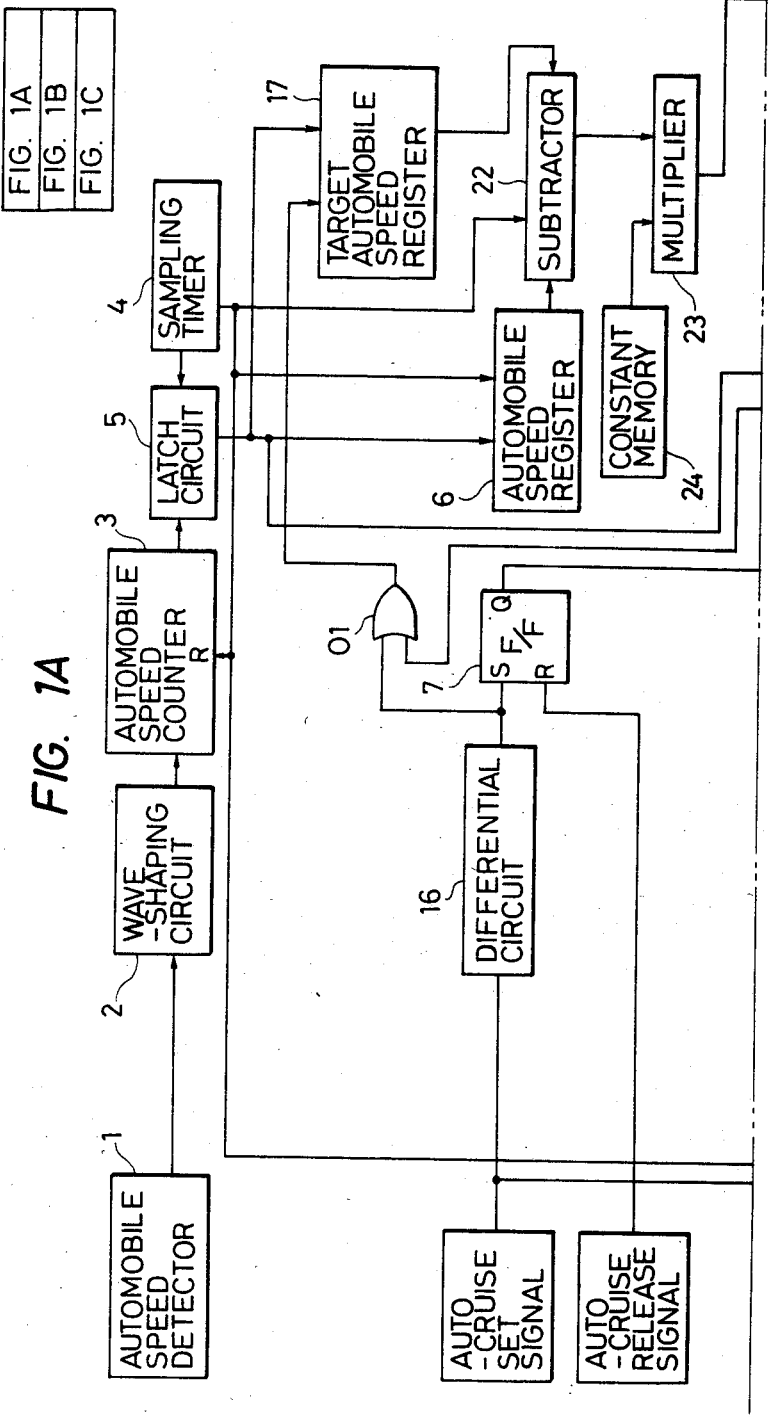

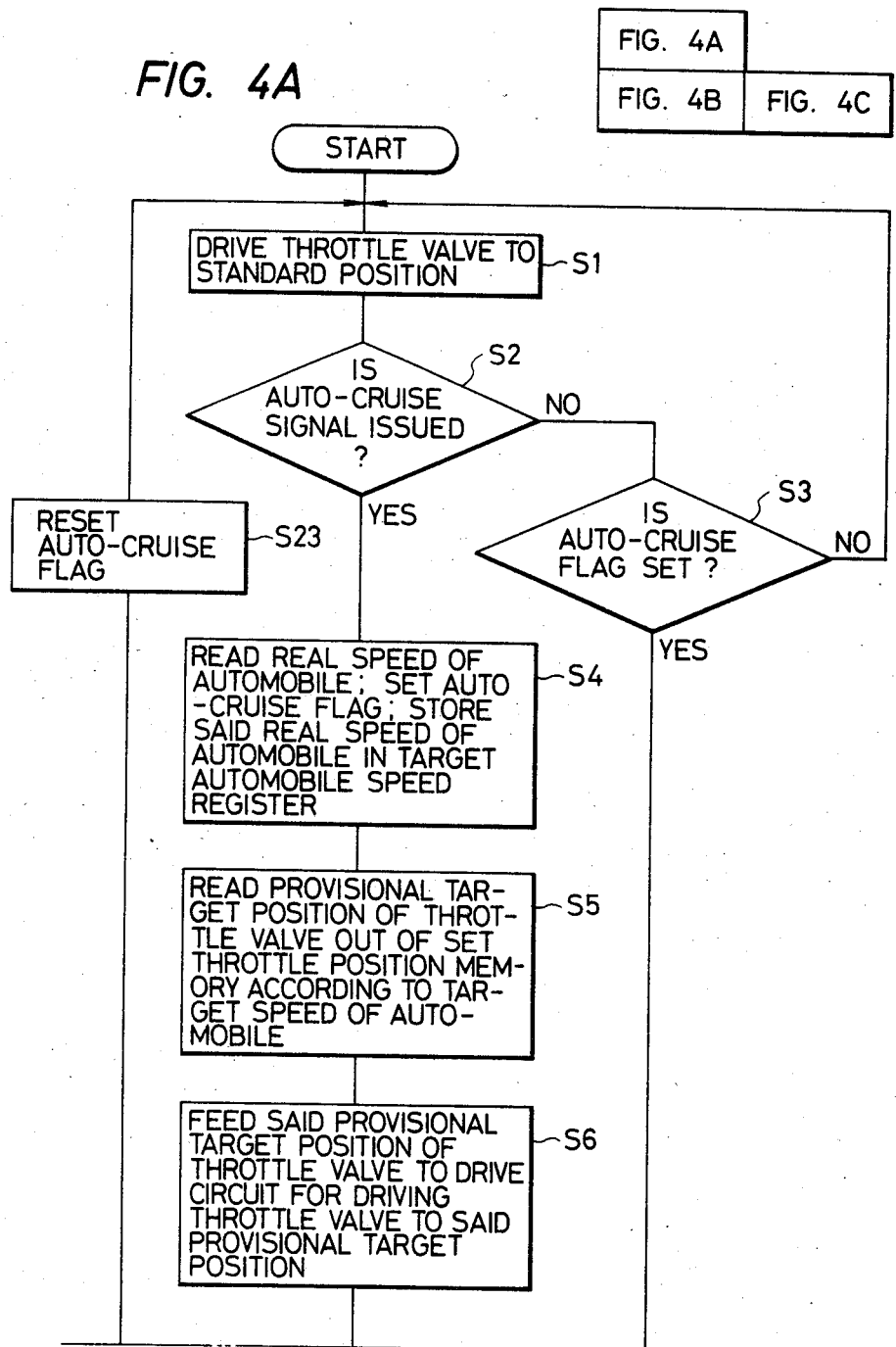

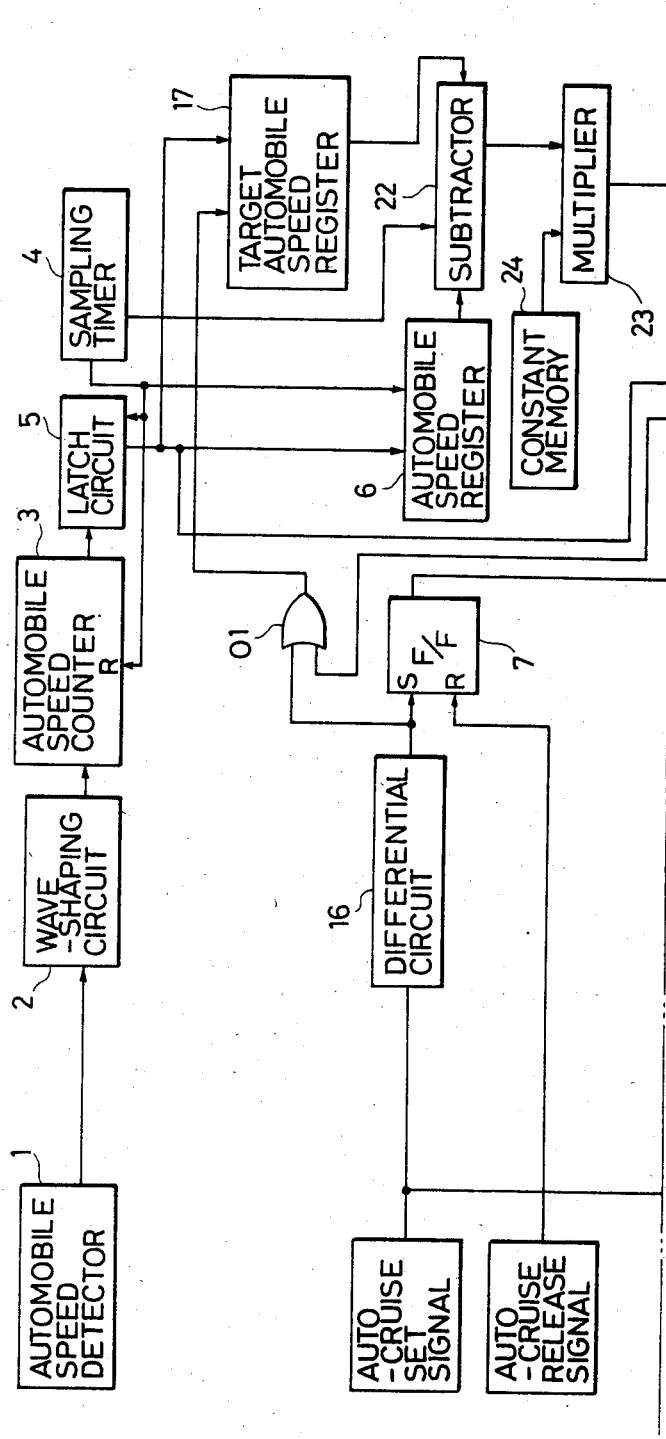

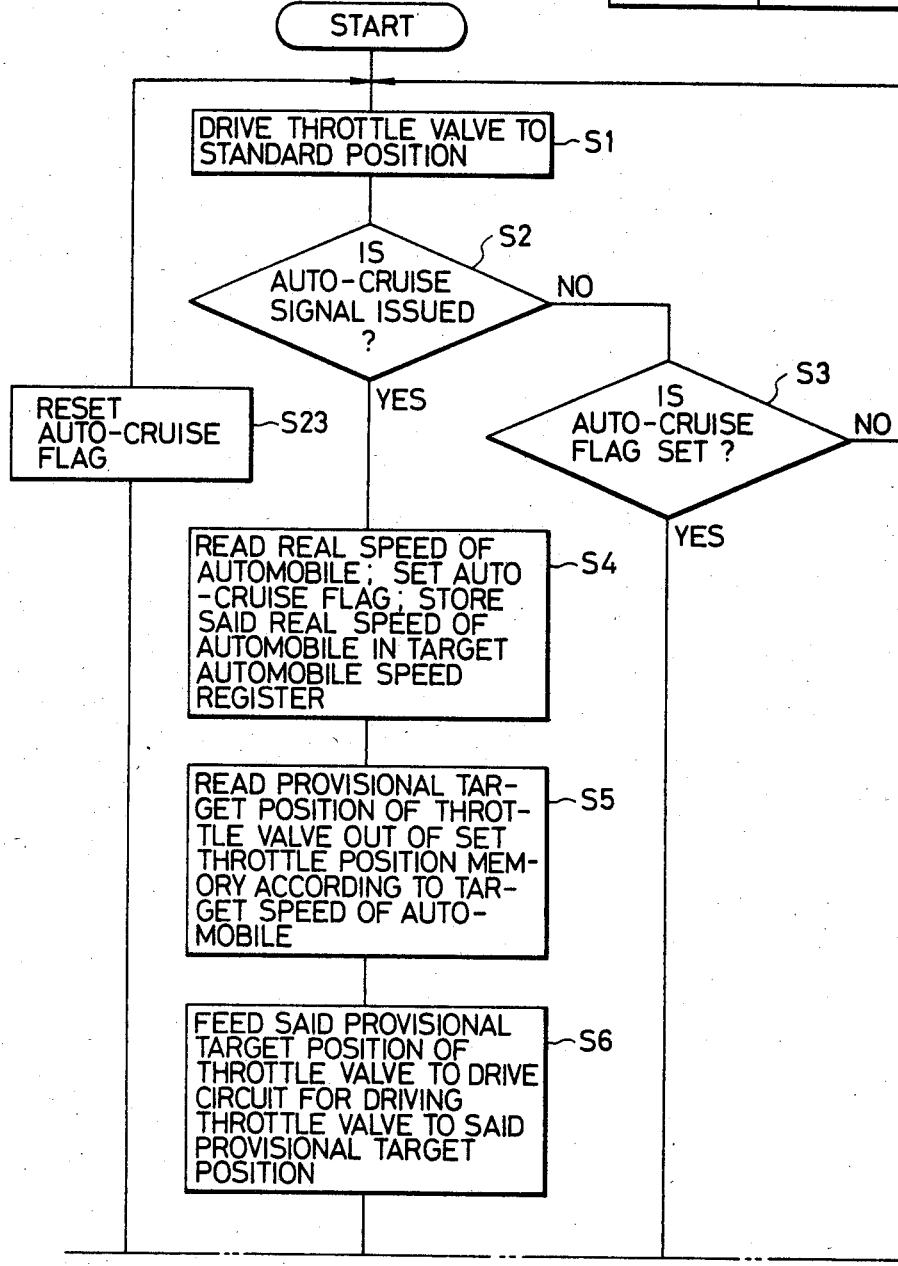

APPARATUS FOR CONTROL OF ACCELERATION AND DECELERATION DURING AUTO-CRUISE

BACKGROUND OF THE INVENTION (1) Field of the Invention

This invention relates to an apparatus for the control of acceleration and deceleration of an automobile in motion during the course of so called "autocruise," i.e. the course of the automobile's travel at the automatically controlled optimum speed. More particularly, this invention relates to an apparatus for the control of acceleration and deceleration of an automobile in motion during the course of auto-cruise, designed to effect smooth control of the increase and decrease in the real speed of the automobile in the status of control of acceleration and deceleration, and to permit smooth transition from the status of acceleration and deceleration to the status of constant-speed cruise or vice versa.

(2) Description of Prior Art

To control acceleration of an automobile in motion during auto-cruise, there may be conceived an idea of increasing the opening angle of the throttle in response to the input of on acceleration signal and, on disappearance of the acceleration signal, fixing the position of the throttle as it exists at that very moment.

In contrast, to control deceleration during auto-cruise, there may be conceived an idea of decreasing the opening angle of the throttle aperture to almost zero, or to the level used for idling operation, in response to the input of a deceleration signal and, on disappearance of the deceleration signal, increasing the opening angle of the throttle to fix the position of the throttle so that it suits the real speed of travel at that very moment thereby to effect required resumption of the constant-speed cruise.

As well known through experience, however, there occurs considerable lag between the time the opening angle of the throttle is increased or decreased and the time the real speed of the automobile's travel correspondingly rises or falls.

When using the method for the control of deceleration described above, the opening angle of the throttle must be increased an excessive amount in effecting the resumption of constant-speed auto-cruise after the disappearance of deceleration signal, with the inevitable result that the attempted transition from deceleration to constant-speed cruise actually produces an acceleration which occurs so sharply as to detact from driving performance, and this also tends to induce detrimental phenomena such as hunting and overshoot in the real speed of cruise after the resumption of auto-cruise.

Further, when using the method for the control of acceleration described above, the initial stage of acceleration is so small as to irritate the driver of the automobile and, even after disappearance of the acceleration signal, the increase in the real speed of cruise continues to exist to a point where there may ensue an overshoot in the real speed of crusise.

SUMMARY OF THE INVENTION

This invention has been perfected to eliminate the drawbacks suffered by the prior art as described above. An object of this invention is to provide an apparatus for the control of acceleration and deceleration of an automobile in motion during the stage of auto-cruise, which apparatus is capable, in the control of acceleration, of more rapidly increasing the real speed of cruise during the initial stage of acceleration and precluding overshoot and hunting in the real speed of cruise after termination of acceleration and, in the control of deceleration, being operative to prevent overshoot and hunting in the real speed of cruise the resumption of the constant-speed cruise after termination of deceleration.

To accomplish the object described above, this invention uses a motor to control the throttle position so as to:

(A) effect acceleration during auto-cruise by carrying out the open-loop control of the throttle opening angle or position comprising the steps of
  (1) unconditionally first producing a temporary abrupt increase in the throttle opening angle by a predetermined amount according to the real speed of the automobile at that very moment, or to the target speed of the automobile during the auto-cruise, then
  (2) gradually increasing the opening angle of throttle according to the time elapsing from the occurrence of acceleration signal—or the time during which the acceleration signal continues to exist, and further,
  (3) on disappearance of the acceleration signal, decreasing the opening angle of throttle by an amount to be determined according to the real speed of the automobile at that very moment, and (B) effect deceleration during auto-cruise by carrying out the open-loop control of the throttle aperture comprising the steps of
  (1) unconditionally producing a temporary abrupt decrease in the throttle opening angle to a value predetermined depending on the real speed of the automobile or the target speed of the automobile during the auto-cruise, or to the level of substantial blockade of the throttle valve, and,
  (2) on disappearance of the deceleration signal, fixing the opening angle of throttle so that it corresponds to a target speed to be determined according to the real speed of the automobile at that very moment.

The apparatus of this invention is designed so that the throttle opening angles for a particular speed of the automobile are smallest at the time that a deceleration signal is present, intermediate at the time that the deceleration signal disappears, and largest at the time that the auto-cruise is set.

DETAILED DESCRIPTION OF THE PREFERRED EMBODIMENTS

Figure 1B:
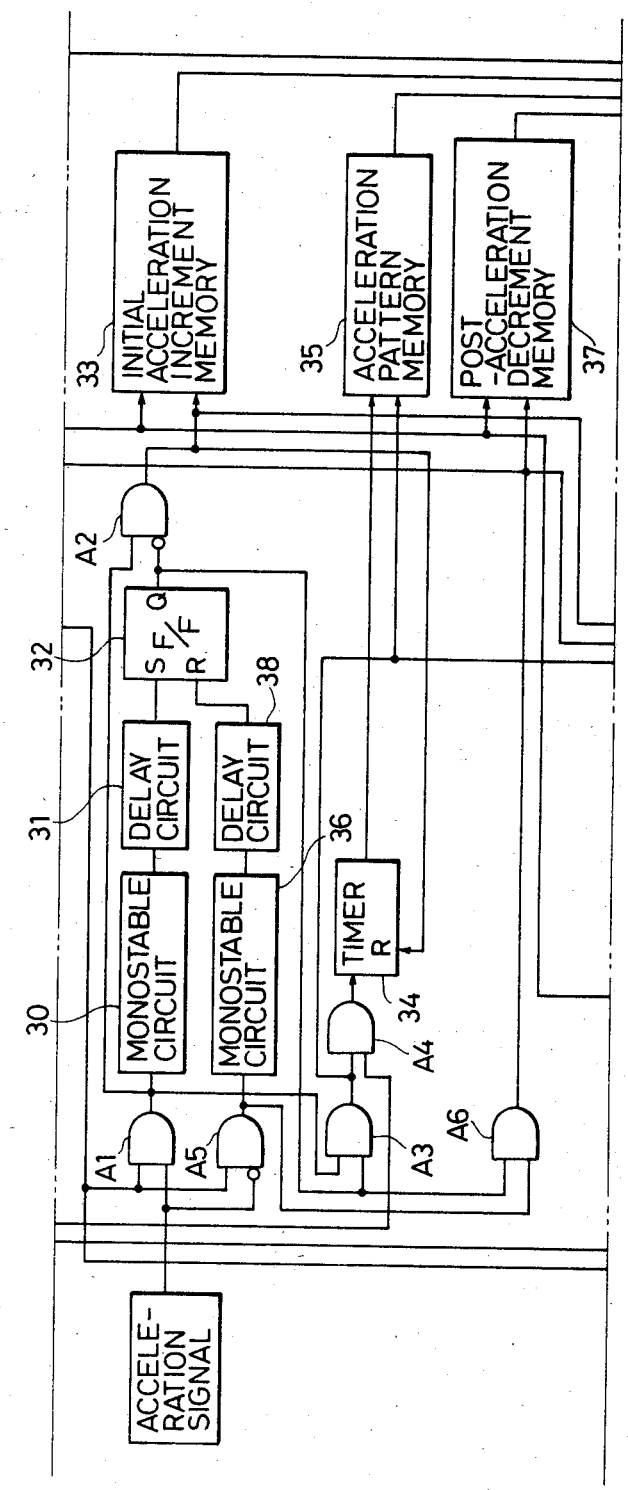
FIG. 1 shows how to combine FIGS. 1A, 1B and 1C which together constitute a block diagram illustrating a first embodiment of the present invention.
Figure 1C:
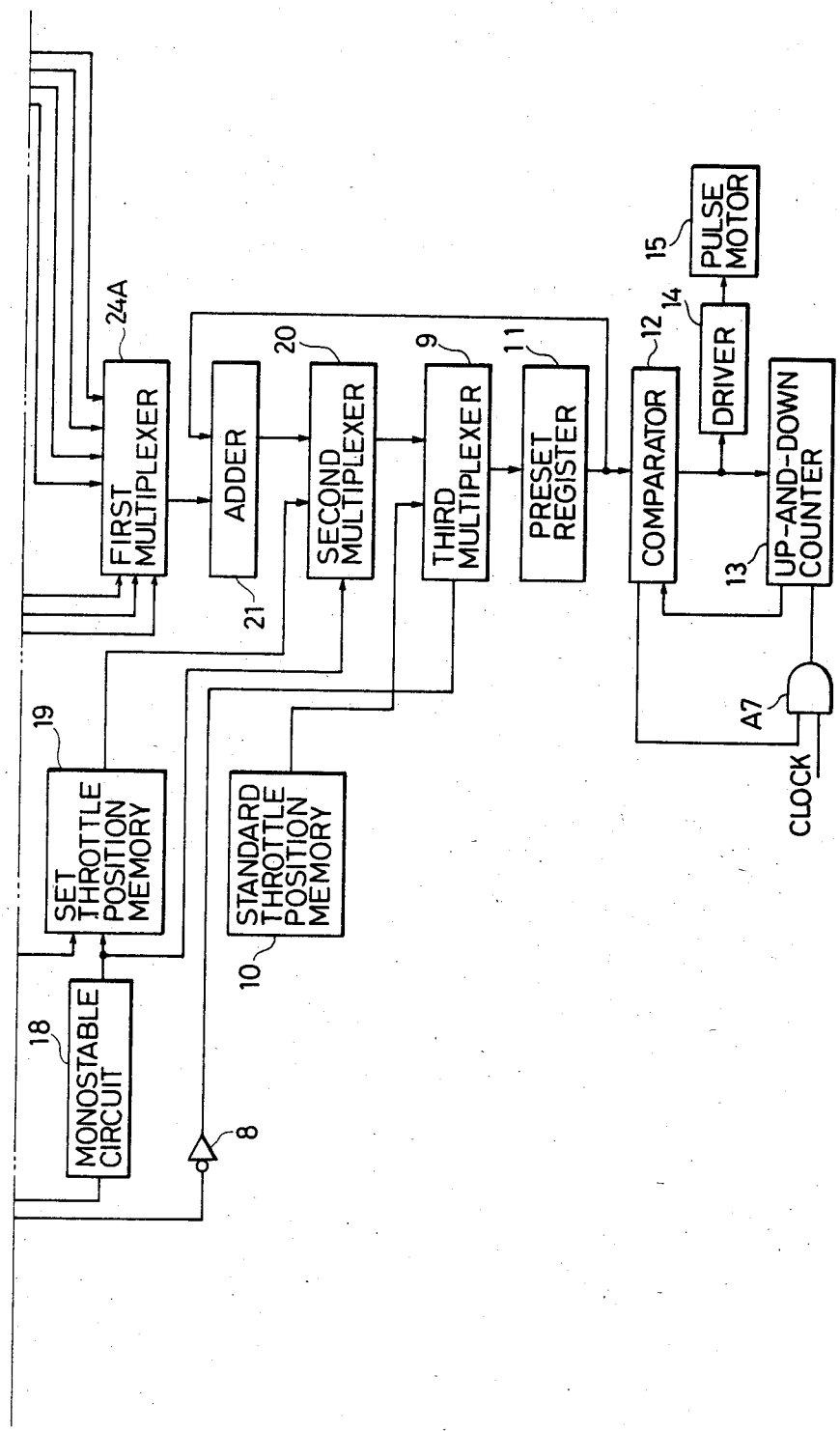

Now, the present invention will be described in detail below with reference to the accompanying drawings. FIGS. 1A, 1B and 1C show a block diagram illustrating a first embodiment of an acceleration control unit in the apparatus of the present invention.

To facilitate comprehension, FIGS. 1A~1C additionally illustrate components for effecting the transition of the speed control of an automobile from manual control to auto-cruise. The description given below, therefore, will embrace those components.

An automobile speed detector 1 issues pulses of a cycle inversely proportional to the real speed of an automobile. The aforementioned pulses are shaped by a wave-shaping circuit 2 and then counted by an automobile speed counter 3. The value of the count in the automobile speed counter 3 within a fixed time interval, therefore, represents the real speed of the automobile.

A sampling timer 4 generates one timing pulse for each such fixed time interval and occurrence of the said timing pulse transfers the value of count in the automobile speed counter 3 to a latch circuit 5 and latches that value in the latch circuit 5 and, at the same time, resets the automobile speed counter 3. The real speed of the automobile temporarily stored in the latch circuit 5 is caused by the aforementioned timing pulse from the sampling timer 4 to be stored in an automobile speed register 6.

While the auto-cruise set is in a released state, namely while the automobile is in the status of manual speed control, an auto-cruise flag (flipflop) 7 is in its reset state (with the output "0").

Consequently, the output from an inverter 8 is at its high level and a third multiplexer 9 selects the output from a standard throttle position memory 10 and feeds it to a present register 11. In the standard throttle position memory 10, a throttle position corresponding to the idle operation of the automobile engine is stored in advance.

A comparator 12 compares the value in an up-and-down counter 13, serving to memorize the current position of a pulse motor 15, with the value memorized in the aforementioned preset register 11 and, depending on the difference between these two values, drives a driver 14 and the pulse motor 15. As the result, the rotational position of the pulse motor 15 or the throttle valve is maintained substantially constant. Such a controlling operation of the pulse motor 15 as described above is described in detail in the specifications of Japanese Laid-Open Patent Applications Nos. SHO 58(1983)-155255 and SHO 58(1983)-155256.

In this case, as indicated in the aforementioned specifications, the throttle valve position can be freely controlled by the automobile driver's own experienced operation of the accelerator pedal.

When an auto-cruise set signal is issued while the speed of the automobile is under manual control as described above, a differential circuit 16 generates a pulse output and consequently sets the auto-cruise flag 7. At the same time, the aforementioned output from the differential circuit 16 is fed via an OR circuit 01 to a target automobile speed register 17.

As the result, the target automobile speed register 17 stores the output from the latch circuit 5 as it exists at that very moment, nament, namely, the real speed of the automobile, as the target speed of the automobile to be referred to thereafter.

In the meantime, the aforementioned auto-cruise set signal is also fed to a monostable circuit 18. The resultant output pulse from monostable circuit 18 drives a memory 19 for the target position of the throttle on setting of auto-cruise (hereinafter referred to simply as "a set throttle position memory"). In this set throttle position memory 19, the provisional target of throttle position to be fixed by the parameter of the target speed of the automobile is stored in advance.

Figure 2:
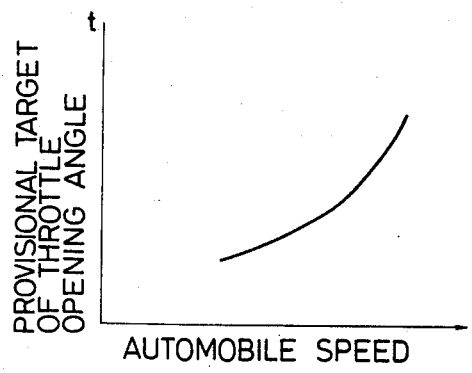
FIG. 2 is a graph showing a typical relation between real speed of an automobile and provisional target value of throttle opening angle.

As the provisional target of throttle position, it is desirable to adopt the throttle position which corresponds to the aforementioned target speed of the automobile applicable to travel of the automobile on a flat road. A typical example of the provisional target of throttle position is illustrated in FIG. 2. In the graph, the horizontal axis represent the speed of the automobile and the vertical axis represents the value of provisional target of throttle opening angle.

Since the set throttle position memory 19 has already stored the target of the automobile, when memory 19 receives an auto-cruise set signal (via monostable circuit 18) at its input, it immediately provides to a second multiplexer 20 data representative of a provisional target throttle position corresponding to the real speed of the automobile as its exists at that moment.

The output pulse from the monostable circuit 18 thus causes the second multiplexer 20 to select the provisional target of the throttle position from the set throttle position memory 19 and feed it to a third multiplexer 9.

At this time, since the auto-cruise flag 7 is in its set state and the output of the inverter 8 is consequently at its low level, the third multiplexer 9 selects the output of the second multiplexer 20 (namely, the aforementioned provisional target of the throttle position) and causes it to be stored in the present register 11.

As the result, the pulse motor 15 is set rotating and the throttle valve is abruptly moved to the position corresponding to the aforementioned provisional target thereof. At the same time, the value stored in the preset register 11 is fed to an adder 21.

In the meantime, the real speed of the automobile is stored through the latch circuit 5 in the automobile speed register 6 at fixed sampling time intervals (such as, for example, 0.5 second) as described above. This real speed of the automobile is compared in a subtractor 22 with the target speed of the automobile from the target automobile speed register 17. The difference between the two values is fed to a multiplier 23.

In the multiplier 23, the aforementioned difference is multiplied by the constant which is read out of a constant memory 24, and the product of this multiplication is conerted into an amount of compensation (a positive or negative number of pulses) for the rotational angle of the pulse motor 15. This amount of compensation is fed via a first multiplexer 24A to the adder 21.

This adder 21, as already described, has taken into storage the output from the present register 11, namely, the provisional target of the throttle position. As the result, the output from the adder 21 is proportionate to the rotational angle or position of the pulse motor 15 corresponding to the throttle position necessary for acquiring the target of the automobile as its exists at that moment.

The aforementioned output from the adder 21 is forwarded through the second multiplexer 20 and the third multiplexer and stored in the preset register 11 and further fed into the comparator 12.

As will be readily understood from what has been described so far, the rotational angle of the pulse motor 15 and the opening angle of the throttle are controlled by means of feedback to have the respective values necessary for retaining the target speed of the automobile.

As is clear from the foregoing description, the present invention initially sets the throttle position, during the course of auto-cruise set, at the provisional target position determined in advance according to the target speed of the automobile, finds the deviation of the real speed of the automobile relative to the target speed of the automobile, and carries out the feedback control of the throttle position, with said target position of the throttle valve as the starting point.

Consequently, the present invention manifests advantageous effects such as decreasing (or approximating to average) the deviation immediately after autocruise set, precluding adverse phenomenon like decreasing and or hunting of the speed of the automobile, and shorting the time required for convergency to the target speed of the automobile. Thus, it can notably smoothen the transition from the manual control to auto-cruise control.

The manner in which acceleration of the automobile is effected during the auto-cruise Will now be described with reference to FIG. 1A~1C.

When the driver of the automobile actuates an acceleration switch while the automobile is in auto-cruise, namely while the auto-cruise flag 7 is in set state, an acceleration signal continues to be provided so long as the acceleration switch is kept operated. The acceleration signal and the set output of the flip flop 7 are both supplied as inputs to an AND gate A1, and the resultant output signal of the AND gate A1 triggers a monostable circuit 30 which feeds out one pulse. This output of one pulse is fed to a delay circuit 31 the output of which sets a flip flop 32 after the time delay imposed by delay circuit 31.

Since a flipflop 32 has not yet been set when the output signal of the AND gate A1 described above commences, an AND gate A2 issues an ouput "1". This output from gate A2 effects a read-out of data from a memory 33 for the addend or the throttle opening angle to be increased at the beginning of acceleration (hereinafter referred to simply as "an initial acceleration increment memory"). The data read out of said initial acceleration increment memory 33, namely the value of incremental addition, is fed via the first multiplexer 24A to the adder 21.

Consequently, the value stored in the preset register 11 is increased by the aforementioned value of incremental addition, the pulse motor 15 is rotated by an angle corresponding to this value of incremental addition, and the throttle opening angle is proportionately increased. As the result, the acceleration of the real speed of the automobile is realized.

In this case, the value of incremental addition to be memorized in the initial acceleration increment memory 33 has, as its parameter, the real speed of the automobile as it exists at that moment.

When the output of the monostable circuit 30, which has been delayed by the delay circuit 31, is compled to the set terminal of the flip-flop 32, said flipflop 32 is set. The set output of flip flop 32 is coupled to an input of an AND gate A3. At this time, since the acceleration signal still continues to exist, the output of the AND gate A3 is raised and an AND gate A4 is opened to trigger operation of a timer 34.

Consequently, timer 34 takes a count of the timing pulses issued from the sampling timer 4. The output from the timer 34, therefore, represents the time which elapses since the execution of the incremental addition immediately after acceleration.

In the meantime, the output "1" from the AND gate A3 causes selection of an acceleration pattern memory 35 and, at the same time, switches the first multiplexer 24A so as to derive readout data from the aforementioned acceleration pattern memory 35.

The acceleration pattern memory 35 has stored therein the value of incremental addition required for acceleration with the aforementioned elapse of time as its parameter. This value value of incremental addition is also fed via the adder 21, the second multiplexer 20 and the third multiplexer 9 to the preset register 11.

As the result, the comparator 12 generates an output to actuate the pulse motor 15 and increase the throttle opening angle each time the sampling timer 4 issues a sampling pulse.

When a desired acceleration is completed and the acceleration signal disappears, the output from an AND gate A5 is raised to its high level and the resultant gate output signal "1" is applied to a monostable circuit 36 to trigger it.

At the same time, the "1" output from the AND gate A5 is coupled to one input of an AND gate A6, the other input of which is provided by the set output of flip flop 32 and the output from this AND gate A6 is consequently raised. The output "1" from the AND gate A6 is fed via the OR gate 01 to the target automobile speed register 17, and the target automobile speed register 17 stores the real speed of the automobile existing at that moment as a new target speed of the automobile.

At the same time that the new target speed is stored in register 17, the output from the AND gate A6 effects a readout of data from a post-acceleration decrement memory 37 via the first multiplexer 24A. The post-acceleration decrement memory 37 has stored therein the subtrahend or the amount of compensation in the decreasing direction of the throttle opening angle to be executed immediately after disappearance of the acceleration signal, with the real speed of the automobile as its parameter.

When the acceleration is completed, therefore, the aforementioned amount of compensation in the decreasing direction is applied via the first multiplexer 24A to the adder 21 and the compensated target value of throttle opening angle is forwarded through the second multiplexer 20 and the third multiplexer 9 and stored in the preset register 11.

In this manner, the throttle opening angle is decreased after disappearance of the acceleration signal by a fixed value to be determined according to the real speed of the automobile as it exists at that moment.

The output pulse from the aforementioned monostable circuit 36 is delayed by a predetermined time in a delay circuit 38 and then coupled to the reset terminal of the flipflop 32 to reset it. As the result, the AND gates A2, A3, and A6 are closed.

After that, auto-cruise control is effected on the accelerated, new target speed of the automobile in the same manner as described above.

Figure 3A:
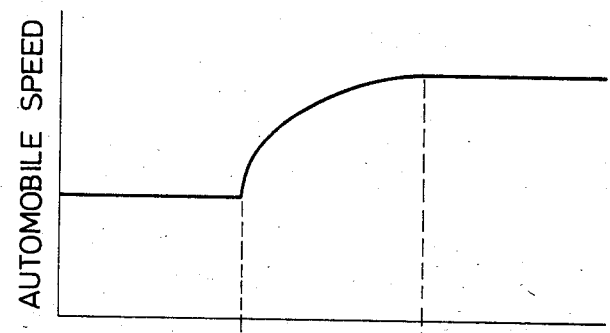
FIGS. 3A and 3B are the graphs showing typical variations in real speed of an automobile and throttle opening angle as the functions of time as the automobile is accelerated in auto-cruise.
Figure 3B:
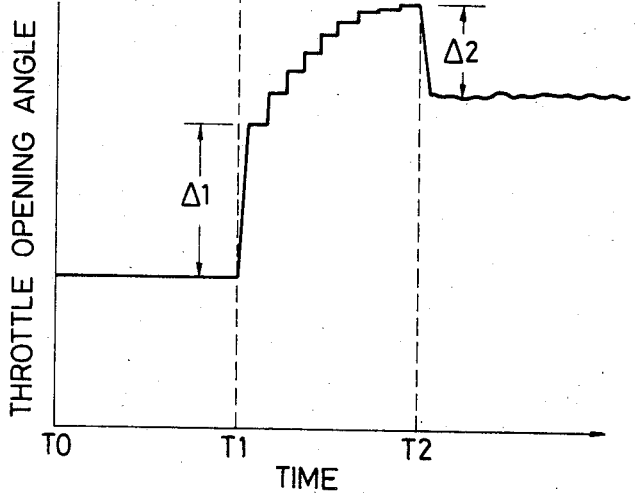

FIGS. 3(A) and 3(B) are diagrams illustrating typical variations in automobile speed and throttle position under the conditions of the aforementioned auto-cruise and acceleration control.

The time from the point T0 to the point T1 represents the ordinary period of auto-cruise in which the real speed of the automobile and the position of the throttle are maintained substantially constant. The time between the points T1 and T2 represents the period during which the driver of the automobile operates the acceleration switch and the acceleration switch, therefore, keeps issuing acceleration signals.

At the time T1, the throttle opening angle is abruptly increased by the value Δ1 which corresponds to the readout data from the initial acceleration increment memory 33 and the real speed of the automobile is proportionately increased. After that, the throttle opening angle is increased at each fixed time interval according to the readout data from the acceleration pattern memory 35 and the real speed of the automobile keeps on increasing.

In this case, the readout data mentioned above are preferably such that the amount of the throttle opening angle to be increased for each fixed time interval will successively decrease with elapse of time.

At the time T2, as the operation of the acceleration switch is stopped, the throttle valve is abruptly closed by the value Δ2 proportionate to the real speed of the automobile as it exists at that moment, in accordance the readout data from the post-acceleration decrement memory 37. The normal auto-cruise is resumed immediately thereafter.

With reference to the block diagram of FIG. 1, the set throttle position memory 19 may use the position of the transmission gears and/or the rotational number of the engine as its parameters in the place of the speed of the automobile.

Optionally, each of the memories such as the set throttle position memory 19, the initial acceleration increment memory 33, the acceleration pattern memory 35, and the post-acceleration decrement memory 37 comprises a plurality of different memories which are interchangeably put to use. Otherwise, the readout data from these memories may be suitably compensated as by addition or multiplication before they are fed to the subsequent circuits. This special arrangement enables the driver of the automobile to select the manner of the transition of the automobile control from manual control to auto-cruise control (slow smooth transition or abrupt transition) and the manner of acceleration (slow acceleration or abrupt acceleration), depending on his personal preference or the operating condition existing on the particular occasion.

So far, the transition of the control of the speed of automobile from the driver's manual control to automatic control, and the control of acceleration in auto-cruise as contemplated by the present invention, have been described as being embodied in hardware consisting of wired logic circuits. As is quite evident to those skilled in the art, this invention can also be embodied with the aid of an electronic computer.

The steps which make up the procedure involved in this latter case will be described below with reference to the flow chart of FIGS. 4A, 4B and 4C.

Step S1

As the ignition switch of the engine is turned on to start the system operating, the throttle valve is driven to a standard position which, for example, may substantially correspond to the throttle opening angle during the idling of the automobile.

Step S2

It is judged whether the auto-cruise signal has been received or not. In the mode of normal manual speed control, since no entry of this signal is involved, the operation proceeds to Step S3.

Step S3

It is judged whether the auto-cruise flag has been set or not. In the mode of normal manual speed control, since the setting of this flag is not involved, the operation returns to Step S1. In the mode of manual speed control, therefore, the operation is circulated through the loop of Step S1→Step S2→ Step S3→Step S1.

Step S4

When the entry of the auto-cruise signal has been confirmed by the judgment of Step S2, the operation proceeds to Step S4 where the real speed of the automobile is read, the auto-cruise flag is set, and the real speed of the automobile is entered into the target automobile speed register.

Step S5

The provisional target position of the throttle valve is read out of the set throttle position memory 19, according to the aforementioned target speed of the automobile.

Step S6

The aforementioned provisional target position of the throttle valve is fed to the drive circuit to drive the throttle valve to that position.

Step S7

It is judged whether the acceleration flag has been set or not. When this flag has not been set, the operation proceeds to Step S8.

Step S8

It is judged whether the acceleration signal has been received or not.

Step S9

It is judged whether the auto-cruise release signal has been received or not. When this signal has not been received, the operation proceeds to Step S10.

Step S10

It is judged whether the automobile speed sampling timer has issued its output or not. When the output has not been issued, the operation returns to Step S7. After that, the operation is circulated through the loop of Step S8→Step S9→Step S10, awaiting the issuance of the output from the sampling timer. The operation proceeds to Step S11 when the timer issues its output.

Step S11

The real speed of the automobile is read in and the value of compensation for the throttle position is calculated based on the deviation of the real speed of the automobile from the target speed of the automobile. Otherwise, the aforementioned value of compensation may be read out of a proper memory.

Step S12

The value of compensation for the throttle position is fed to the drive circuit to drive the throttle valve by way of correction.

After this step, the processing returns to Step S7 and the auto-cruise control of the automobile is carried out by circulation through the loop of Step S7→Step S8→Step S9→Step S10→Step S11→Step S12.

When the acceleration signal is received while the aforementioned auto-cruise control is in process, the judgment of Step S8 yields an affirmative result. Thus, the operation proceeds to Step S13.

Step S13

The real speed of the automobile as it exists at this moment is read in and the amount of the throttle opening angle to be increased is read out of the initial acceleration increment memory.

Step S14

The acceleration flag is set up.

Step S15

The acceleration signal continuation time counter, for taking count of the time elapsing from the entry of the acceleration signal, is reset.

After this step, the processing proceeds to Step S12. The increment of the throttle opening angle read out in the former step, Step S13, is fed to the drive circuit to increase the opening angle of the throttle valve proportionately.

Then, as the processing returns to Step S7, since the acceleration flag has already been set up, the processing is made to proceed to Step S16.

Step S16

It is judged whether the presence of the acceleration signal is still continuing or not. When the acceleration signal is still present, the processing proceeds to Step S17.

Step S17

It is judged whether the acceleration signal continuation time counter has issued its output or not. When this output has not been issued, the processing circulates through the loop of Step S16 and S17, awaiting the issuance of the output.

Step S18

The content of the time counter is increased by "1" when the judgment of Step S17 confirms the issuance of the time counter output.

Step 19

The value of compensation for the throttle position is read out of the acceleration pattern memory, with the count of time counter as the parameter.

After this step, the processing again proceeds to Step S12. The value of compensation for the throttle position which has been read out in the preceding step is fed to the drive circuit to effect gradual increase in the opening angle of the throttle valve.

The processing again returns from Step S7 to Step S16 and continues to be circulated through the loop of Step S17→Step S18→Step S19→Step S12→Step S7→Step S16, so long as the presence of the acceleration signal continues.

Step S20

When the judgment of Step S16 has confirmed the disappearance of the acceleration signal, the real speed of the automobile as it exists is read in and the amount of the throttle opening angle to be decreased is read out of the post-acceleration decrement memory.

Step S21

The acceleration flag is reset.

Step S22

The real speed of the automobile formerly read in Step S20 is stored in the target automobile speed register.

After this step, the processing proceeds to Step S12. The amount of the throttle opening angle to be decreased which has been read out in Step S20 is fed to the drive circuit to drive the throttle valve in the direction of decreasing the opening angle.

As the processing returns again to Step S7, since the acceleration flag has been already reset, the processing is made to proceed to Step S8. Since the acceleration signal has already disappeared, the processing is circulated through the loop of Step S9→Step S10→Step S11→Step 12.

In the manner described above, the auto-cruise control is carried out with the real speed of the automobile existing after acceleration taken as the target. When the auto-cruise release signal is received while the auto-cruise control is in process, the judgment in Step S9 yields an affirmative result. Thus, the processing is advaned to Step S23.

Step S23

The auto-cruise flag is reset and the processing returns to Step S1. Then, the throttle valve is driven to the position of the standard opening angle and the operation is returned to the initial manual speed control mode.

As is evident from the foregoing description, in accordance with a first aspect of this invention, the otherwise inevitable lag in starting the acceleration is eliminated because the throttle opening angle is abruptly increased according to the input of the acceleration signal in the status of the auto-cruise control. Further, on disappearance of the acceleration signal, the detrimental phenomena such as overshoot and hunting of the real speed of the automobile are precluded because the throttle opening angle can be abruptly decreased by the amount according to the real speed of the automobile as it exists at the moment.

Now, a second aspect of this invention, namely the deceleration control of the automobile in the status of auto-cruise, will be described with reference to FIG. 5.

Figure 5B:
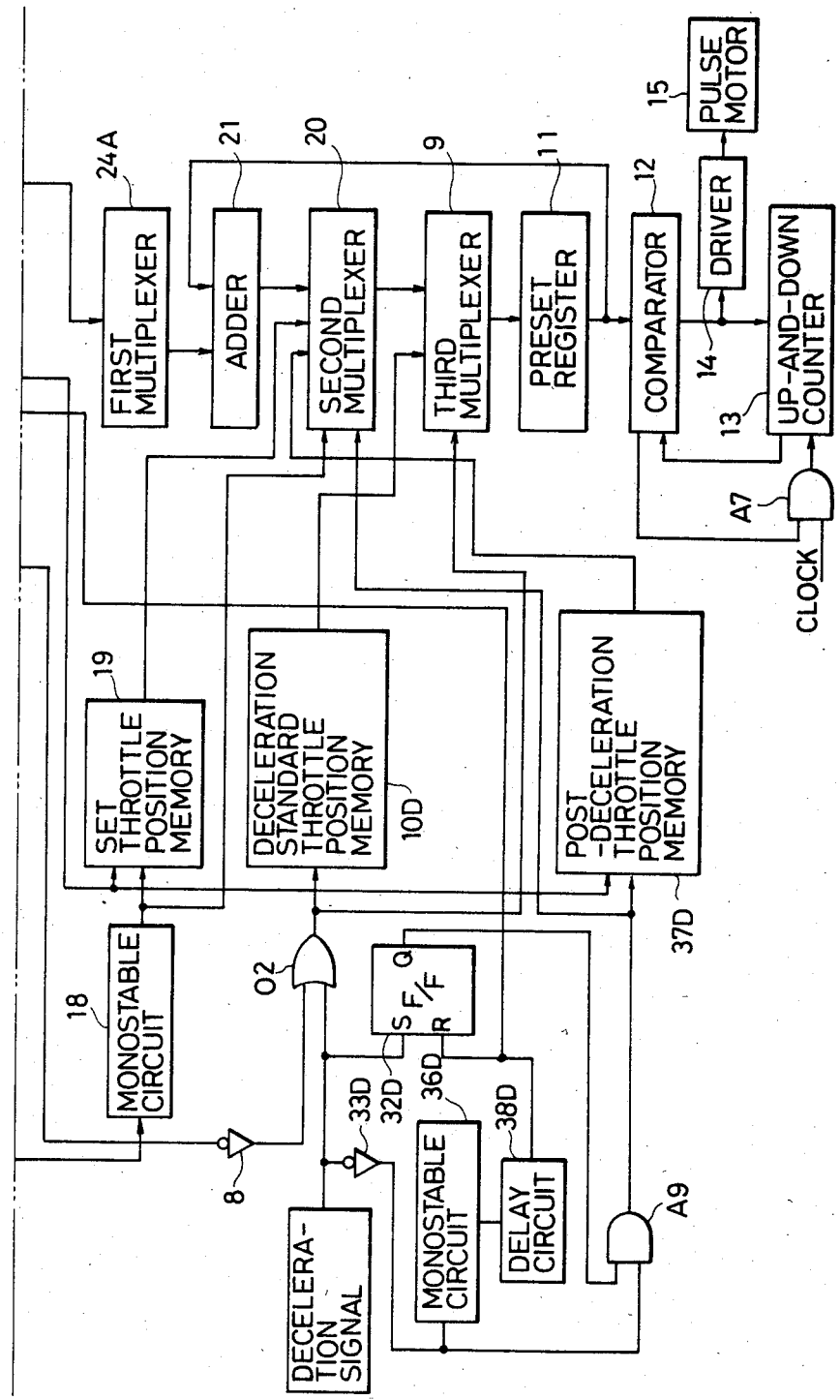
FIG. 5 shows how to combine FIGS. 5A and 5B which together constitute a clock diagram illustrating a second aspect of the present invention.

In this FIG. 5, the same numerals as are used in FIG. 1 denote elements which are identical or equivalent to those in FIG. 1. And for the sake of simplicity of illustration, in FIG. 5, the parts used for acceleration control of the automobile in the auto-cruise status are abbreviated.

As will be readily understood by those skilled in the art, while the auto-cruise set is off, namely under the condition of normal manual speed control, the operation involved in this second aspect of the invention is identical with that of the first aspect described above with reference to FIG. 1, except for the following points.
(1) The high-level output from the inverter 8 is fed via the OR circuit 02 to the standard throttle position memory 10D.
(2) At the same time, in response to the aforementioned output from the inverter 8, the third multiplexer 9 selects the output from the standard throttle aperture memory 10D and feeds it to the preset register 11.
(3) In response to the output pulse from the monostable circuit 18, the second multiplexer 20 selects the provisional target position from the set throttle position memory 19 and feeds it to the third multiplexer 9.
(4) While the auto-cruise flag 7 is in its set condition, the third multiplexer 9 selects the output (namely, the aforementioned provisional target position) from the second multiplexer 20 and causes it to be stored in the preset register 11.

With reference to FIG. 5, when the driver of the automobile operates the deceleration switch while in auto-cruise, namely under the condition in which the flip-flop or the auto-cruise flag 7 is set, a deceleration signal of the high level is issued so long as the status continues to exist.

Since this deceleration signal is fed to the third multiplexer 9 and the standard throttle position memory 10D through an OR circuit 02, the throttle position as it exists during the idle operation is stored in the preset register 11. As the result, the comparator 12 issues its output to rotate the pulse motor 15, decrease the throttle opening angle, and effect deceleration of the real speed of the automobile.

Figure 8:
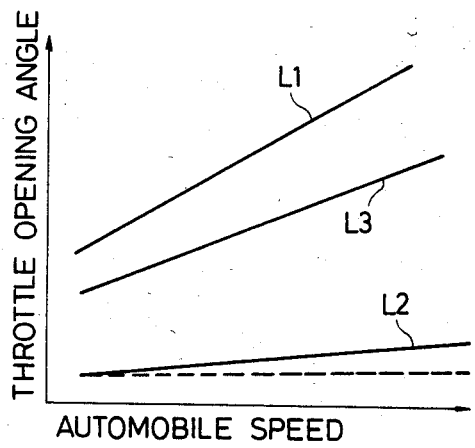
FIG. 8 is a diagram showing values of throttle opening angle in various control modes as the function of real speed of an automobile.

In this case, the throttle position to be stored in the standard throttle position memory 10D may be that which utilizes, as its parameter, the real speed of the automobile as it exists at that moment (see Curve L2 in the diagram of FIG. 8).

The deceleration signal is also supplied to the set terminal of the flip-flop or the deceleration flag 32D. Thus, the deceleration flag 32D is set up. Consequently, the AND gate A9 is opened.

When the deceleration signal disappears and the automobile speed has decreased to a low level after a desired deceleration has been completed, the output from the inverter 33D is raised to a high level and the resultant inverter output signal "1" is coupled to the monostable circuit 36D to trigger it.

At the same time, the AND gate A9 issues its output. In response to the output from the AND gate A9, the post-deceleration throttle position memory 37D is selected and the second multiplexer 20 is caused to select and feed out as its output the read-out data from the post-deceleration throttle position memory 37D. The post-deceleration throttle position memory 37D has stored therein the value of throttle opening angle to be set immediately after disappearance of the deceleration signal, with the real speed of the automobile as its parameter. When the deceleration is completed, therefore, the aforementioned value of throttle opening angle is forwarded via the second multiplexer 20 and the third multiplexer 9 to be stored in the preset register 11.

In this case, the value of throttle opening angle, as indicated by Curve L3 in FIG. 8, is desired to be selected so that it will be smaller than the value stored in the set throttle position memory 19 (indicated by Curve L1 in FIG. 8) and larger than the value stored in the standard throttle position memory 10D (indicated by Curve L2 or dotted line in FIG. 8) relative to a particular real speed of the automobile.

In this manner, the throttle opening angle, after disappearance of the deceleration signal, is set at the predetermined level depending upon the real speed of the automobile as it exists at that moment.

The output pulse from the monostable circuit 36D is delayed by a preset time in the delay circuit 38D and is then supplied to the reset terminal of the flipflop 32D to reset it. As the result, the AND gate A9 is closed. Since the output "1" from the delay circuit 38D is forwarded via the OR gate 01 to the target automobile speed register 17, the target automobile speed register 17 is caused to store as the target automobile speed the real speed of the automobile as it exists at that moment. After that, the auto-cruise control is carried out on the decelerated, new target speed of the automobile in the same manner as described above.

Figure 6A:
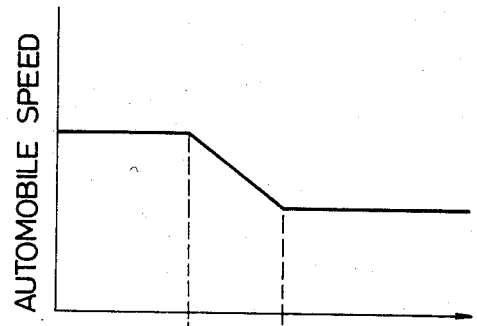
FIGS. 6A and 6B are graphs showing typical variations in real speed of an automobile and throttle opening angle or position as functions of the time as the speed of the automobile is shifted from manual control to auto-cruise and further to deceleration in the status of auto-cruise.
Figure 6B:
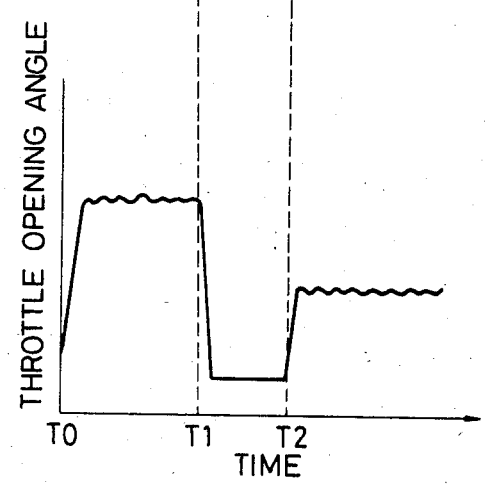

FIG. 6(A) and 6(B) are diagrams illustrating typical variations of the automobile speed and the throttle position under the conditions of the aforementioned auto-cruise and deceleration control.

The time between points T0 and T1 represents the period of normal auto-cruise. When the auto-cruise signal is received at the time T0, the throttle opening angle is abruptly increased from the standard position stored in the standard throttle position memory 10D (the value corresponding to the idle operation, for example) to the provisional position read out of the set throttle position memory 19.

After that, the throttle opening angle is gradually adjusted through feedback control to the level suitable to the target speed of the automobile stored in the target automobile speed register 17. Thereafter, up to the time T1, the real speed of the automobile and the throttle position are maintained substantially constant.

The time between points T1 and T2 represents the period in which the driver of the automobile operates the deceleration switch and the deceleration signal is issued.

When the deceleration signal is issued at the time T1, the throttle opening angle is abruptly decreased to the position of the standard value read out of the standard throttle position memory 10D and is maintained at that position. Consequently, the real speed of the automobile is proportionately decreased.

At the point T2, when the operation of the deceleration switch is stopped, the throttle opening angle is abruptly increased to the value proportionate to the real speed of the automobile as it exists at that moment, in accordance with the read-out data from the post-deceleration position memory 37D. The normal auto-cruise is resumed immediately thereafter.

Optionally, each of the memories such as the set throttle position memory 19 and the post-deceleration position memory 37D may comprise a plurality of different memories which are interchangeably put to use. Otherwise, the read-out data from these memories may be suitably compensated as by addition or multiplication before they are fed to the subsequent circuits. This special arrangement enables the driver of the automobile to select the manner of the transition of the automobile control from manual control to the auto-cruise control (slow smooth transition or abrupt transition) and the manner of deceleration (slow deceleration or abrupt deceleration), depending on his personal preference or the operating condition allowed on the particular occasion.

The control of the deceleration during auto-cruise, as contemplated by the present invention, has been described above as being embodied in hardware consisting of wired logic circuits. As is quite evident to those skilled in the art, the same type of deceleration control can also be effected with the aid of an electronic computer.

The steps which make up the procedure involved in this latter case will be described below with reference to the flow chart of FIGS. 7A through 7C.

Figure 4B:
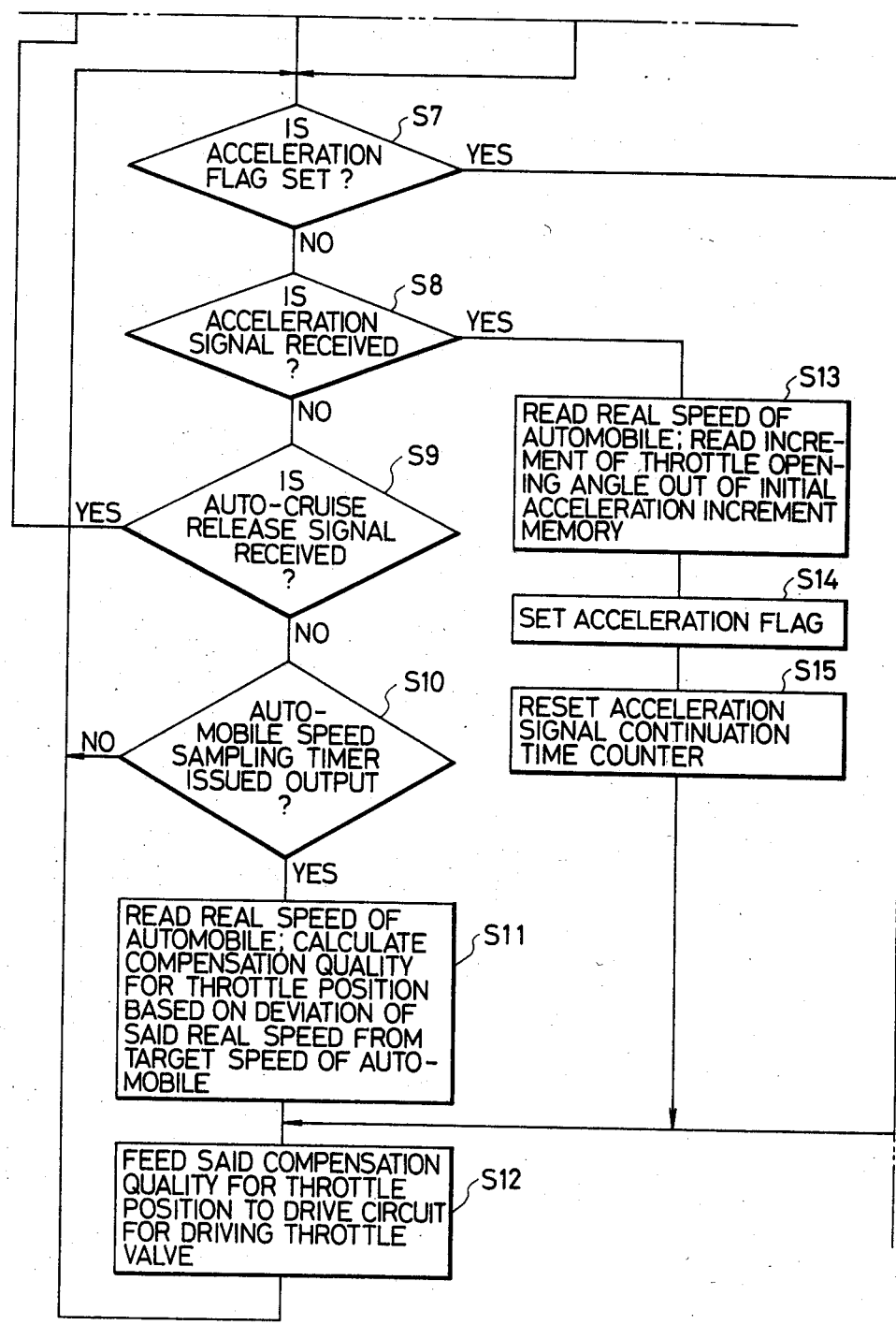
FIG. 4 shows how to combine FIGS. 4A, 4B and 4C which together constitute a flow chart illustrating typical operations of the present invention using an electronic computer.
Figure 4C:
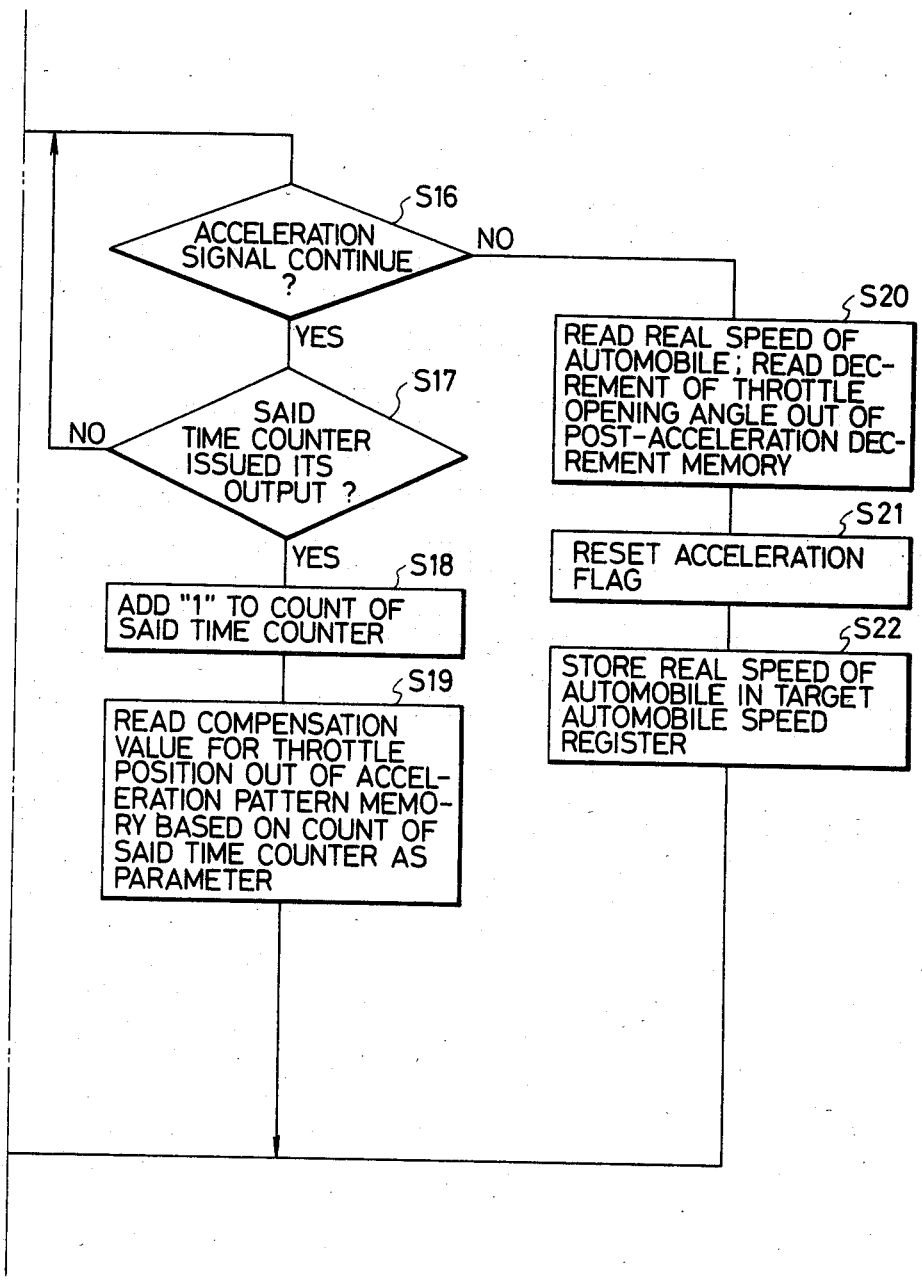
Figure 7B:
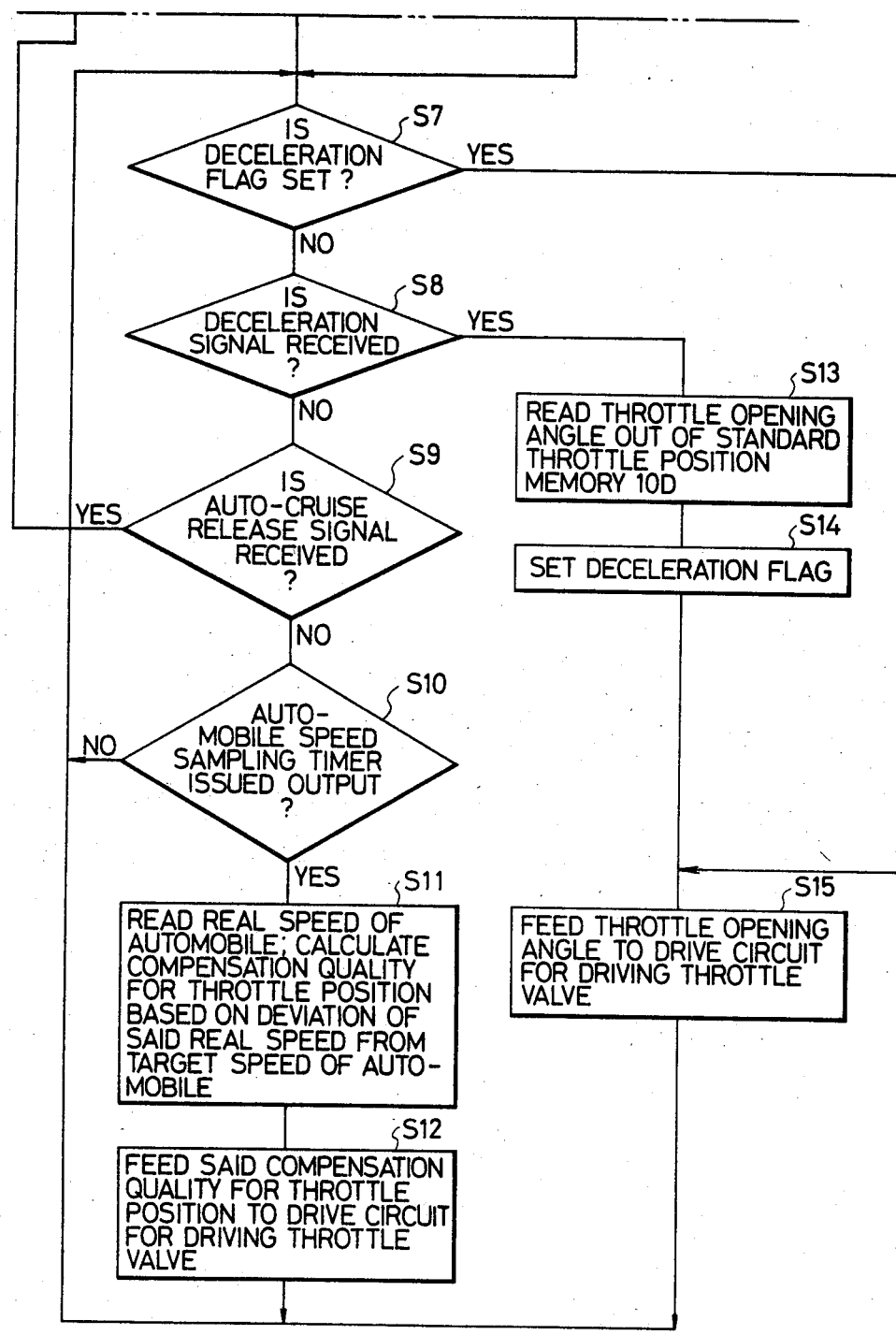
FIG. 7 shows how to combine FIGS. 7A, 7B and 7C which together constitute a flow chart illustrating typical operations of this invention by the use of an electronic computer.
Figure 7C:
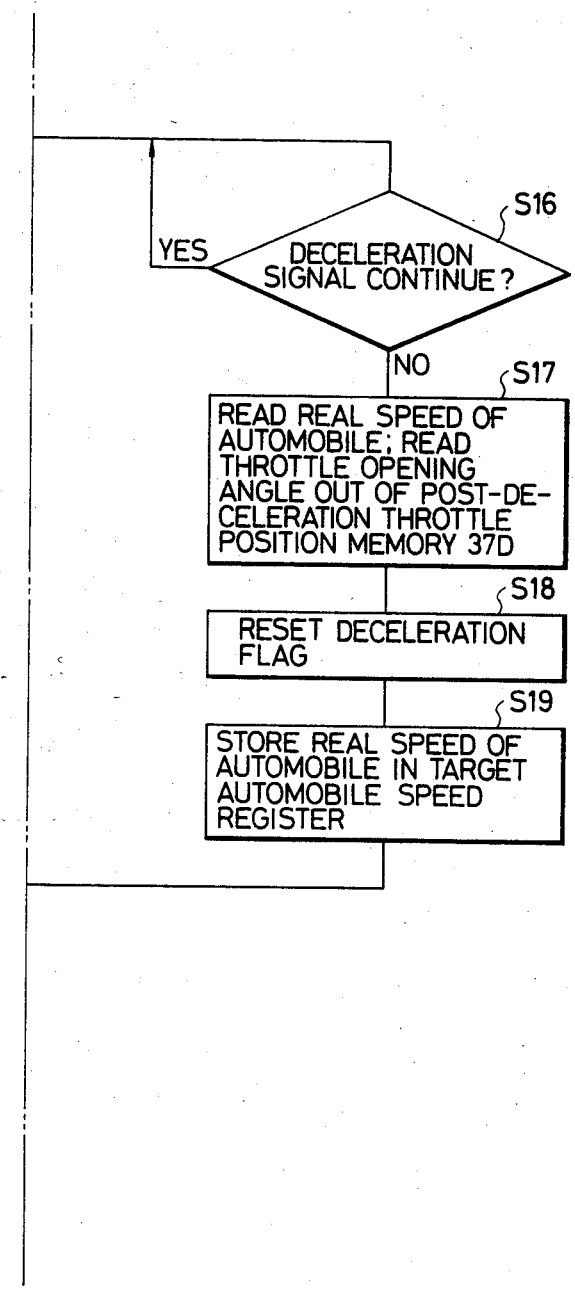

As is obvious from a comparison of FIGS. 7A~7C with FIGS. 4A~4C, the operations in Step S1 through S6, Step S9 through S12 and Step S23 in FIGS. 7A~7C are the same as those shown in FIGS. 4A~4C.

Step S7

It is judged whether the deceleration flag has been set or not. When this flag has not been set, the operation proceeds to Step S8.

Step S8

It is judged whether the deceleration signal has been received or not.

After the Step S12, as described above concerning to FIGS. 4A~4C, the processing returns to Step S7 and the auto-cruise control of the automobile is carried out by circulation through the loop of Step S7→Step S8→Step S9→Step S10→Step S11→Step S12.

When the deceleration signal is received while the aforementioned auto-cruise control is in process, the judgment of Step S8 yields an affirmative result. Thus, the operation proceeds to Step S13.

Step S13

The standard opening angle of the throttle valve substantially equal to that for the idle operation is read out of the standard throttle position memory 10D.

Step S14

The deceleration flag is set up.

Step S15

The value of throttle opening angle read out in the preceding step S13, is fed to the drive circuit to decrease the opening angle of the throttle valve. Consequently, the real speed of the automobile is proportionately lowered.

When the processing is again returned to Step S7, since the deceleration flag has been already set up, the processing is caused to advance to Step S16.

Step S16

It is judged whether the deceleration signal is still continuing to exist or not. When the deceleration signal persists, the judgment of Step S16 is repeated until the deceleration signal disappears.

Step S17

When the judgment of Step S16 has confirmed disappearance of the deceleration signal, the real speed of the automobile is read in and the value of throttle opening angle is read out of the post-deceleration throttle position memory 37D.

Step S18

The deceleration flag is reset.

Step S19

The real speed of the automobile formerly read in Step S17 is stored in the target automobile speed register 17.

After this step, the processing proceeds to Step S15. The quantity of the throttle opening angle read out in Step S17 is fed to the drive circuit to drive the throttle valve in the direction of increasing the opening angle.

As the processing returns again to Step S7, since the deceleration flag has been already reset, the processing is made to proceed to Step S8. Since the deceleration signal has already disappeared, the processing is circulated through the loop of Step S9→Step S10→Step S11→Step 12.

In the manner described above, the auto-cruise control is carried out with the real speed of the automobile existing after deceleration taken as the target. When the auto-cruise release signal is received while the auto-cruise control is in process, the judgment in Step S9 comes to yield the affirmative result. Thus, the processing is advanced to Step S23.

As is clear from the foregoing description, the second aspect of the present invention as applied to the control of deceleration in the auto-cruise status enables the throttle opening angle, on disappearance of the deceleration signal, to be abruptly increased to the predetermined level according to the real speed of the automobile as it exists at the moment. In this case, the aforementioned predetermined throttle opening angle is selected so as to be smaller than the throttle opening angle on setting of the auto-cruise status and larger than the throttle opening angle at the time the deceleration signal is received.

FIG. 8 is a diagram showing typical data depicting this situation. In this graph, the curve L1 represents the throttle opening angle on setting of the auto-cruise status, the curve L2 represents the throttle opening angle during the presence of a deceleration signal, and the curve L3 represents the throttle opening angle after the disappearance the deceleration signal, in each case as a function of the real speed of the automobile. Optionally, the throttle opening angle at the time the deceleration signal is issued may be constant as indicated by the dotted line in the same graph.

In accordance with the second aspect of this invention, therefore, the otherwise inevitable uncomfortable sensation of deceleration-acceleration experienced during the transition from the deceleration control to the constant-speed cruise can be alleviated and the driving performance proportionately improved. Further, the detrimental phenomena of overshoot and/or hunting of the real speed of automobile which are liable to occur during the transition between the completion of deceleration and the start of constant-speed travel can be precluded.

What is claimed is:

1. An apparatus for the control of acceleration of an automobile during the course of auto-cruise, comprising in combination:

means for sampling the real speed of the automobile at predetermined time intervals, a first register for storing, in response to entry of an auto-cruise set signal, the real speed of the automobile which exists at the moment of entry of said set signal as a target speed, means for finding as a first amount the deviation of said real speed of the automobile from said target speed, means for computing an amount of compensation for throttle opening angle based on said deviation, means for generating an acceleration signal during the course of auto-cruise, an initial acceleration increment memory for storing an increment of throttle opening angle at the initial stage of acceleration based on the real speed of the automobile, a timer for counting the duration of the acceleration signal, an acceleration pattern memory for storing an increment of throttle opening angle based on the duration of the acceleration signal, a post-acceleration decrement memory for storing a decrement of throttle opening angle after disappearance of the acceleration signal based on the real speed of the automobile, means for reading as a second amount an increment of throttle opening angle for compensation of throttle position, said second amount being read out of said initial acceleration increment memory in response to issuance of the acceleration signal, means for reading as a third amount an increment of throttle opening angle for compensation of throttle position, said third amount being read out of said acceleration pattern memory in response to said duration of the acceleration signal, means for reading as a fourth amount a decrement of throttle opening angle for compensation of throttle position, said fourth amount being read out of said post-acceleration decrement memory in response to disappearance of the acceleration signal, and means for controlling throttle position based on one of said first, second, third and fourth amounts for compensation of throttle opening angle.

2. An apparatus according to claim 1 wherein at least one of said memories stores therein a plurality of set values of compensation of throttle opening angle for given values of real automobile speed, and one of said plurality of set values is read out as an output according to the manual selection effected by the driver of the automobile.

3. An apparatus for the control of deceleration of an automobile during the course of auto-cruise, comprising in combination:

means for sampling the real speed of the automobile at predetermined time intervals, a first register for storing, in response to entry of an auto-cruise set signal, the real speed of the automobile which exists at the moment of entry of said set signal as a target speed, means for finding the deviation of said real speed of the automobile from said target speed, means for computing an amount of compensation for a throttle opening angle based on said deviation, means for generating a deceleration signal during the course of auto-cruise, a deceleration standard throttle position memory for storing the throttle opening angle at the initial stage of deceleration, a post-deceleration throttle position memory for storing the throttle opening angle on the disappearance of the decleration signal based on the real speed of the automobile, means for reading said throttle opening angle from said deceleration standard throttle position memory in response to issuance of the deceleration signal, means for reading said throttle opening angle from said post-deceleration throttle position memory in response to disappearance of the deceleration signal, and means for controlling throttle position based on the throttle opening angles which are read out of said memories.

4. An apparatus according to claim 3, wherein said throttle opening angle for the initial stage of deceleration is substantially equal to the value for the idle operation of the engine.

5. An apparatus according to claim 3, wherein said throttle opening angle for the initial stage of deceleration is predetermined based on the real speed of the automobile.

6. An apparatus according to claim 3 or claim 4, wherein the value of throttle opening angle stored in said post-deceleration throttle position memory is larger than that in the standard throttle position memory with respect to a fixed speed of the automobile.

7. An apparatus according to claim 3, wherein said post-deceleration throttle position memory using the real speed of the automobile as a parameter therefor stores in memory a plurality of set values of throttle opening angle for given values of the real automobile speed and one of said plurality of set values is read out as an output according to the manual selection effected by the driver of the automobile.

8. An apparatus according to claim 7 wherein the value of throttle opening angle for the initial stage of deceleration read from said deceleration standard throttle position memory is predetermined based on the real speed of the automobile.

9. An apparatus according to claim 7 or claim 8, wherein said deceleration standard throttle position memory stores in memory a plurality of set values of throttle opening angle for given values of the real automobile speed and one of said plurality of set values is read out as an output according to the manual selection effected by the driver of the automobile.

* * * * *